US012617332B2

(12) United States Patent
Lee

(10) Patent No.: US 12,617,332 B2
(45) Date of Patent: May 5, 2026

(54) SIMULATION IMAGE GENERATION METHOD AND SYSTEM FOR ADB EVALUATION OF TEST VEHICLE

(71) Applicant: HYUNDAI MOBIS CO., LTD., Seoul (KR)

(72) Inventor: Soo Bong Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 285 days.

(21) Appl. No.: 18/071,012

(22) Filed: Nov. 29, 2022

(65) Prior Publication Data

US 2024/0067077 A1 Feb. 29, 2024

(30) Foreign Application Priority Data

Aug. 23, 2022 (KR) ........................ 10-2022-0105438

(51) Int. Cl.
*B60Q 1/08* (2006.01)
*G01C 21/00* (2006.01)

(52) U.S. Cl.
CPC ........... *B60Q 1/08* (2013.01); *G01C 21/3811* (2020.08); *G01C 21/3896* (2020.08); *B60Q 2300/10* (2013.01); *B60Q 2300/322* (2013.01); *B60Q 2300/40* (2013.01)

(58) Field of Classification Search
CPC ................. B60Q 1/08; B60Q 2300/10; B60Q 2300/322; B60Q 2300/40; B60Q 1/14; G01C 21/3811; G01C 21/3896; G01M 17/007; G01M 11/06; G01M 11/065; G01M 11/02; G06T 17/05; G06F 11/3457

USPC ............................................................. 701/3
See application file for complete search history.

(56) References Cited

U.S. PATENT DOCUMENTS

| | | | | |
|---|---|---|---|---|
| 9,114,754 B2 * | 8/2015 | Ehlgen | ................. | G01M 11/064 |
| 2015/0057920 A1 | 2/2015 | Von Zitzewitz et al. | | |
| 2018/0157770 A1 * | 6/2018 | Kim | ........................ | G06F 30/20 |
| 2021/0341935 A1 * | 11/2021 | Du | ........................ | G01M 17/06 |

FOREIGN PATENT DOCUMENTS

| | | | | | |
|---|---|---|---|---|---|
| CN | 114184358 A | * | 3/2022 | | |
| DE | 102011017697 A1 | | 10/2012 | | |
| KR | 20120034455 A | | 4/2012 | | |
| KR | 2018036287 A | * | 4/2018 | ............. | G01C 21/32 |
| KR | 1020200125197 A | | 4/2020 | | |
| KR | 2020125197 A | * | 11/2020 | | |

OTHER PUBLICATIONS

Office Action issued Feb. 27, 2023 in corresponding German Patent Application 102022213125.8.

* cited by examiner

*Primary Examiner* — Hitesh Patel
*Assistant Examiner* — Ashleigh Nicole Turnbaugh
(74) *Attorney, Agent, or Firm* — NovoTechIP International PLLC

(57) ABSTRACT

The present invention relates to a technology for collecting map information including terrain information through a collectible open map service without actual road measurement information and generating a simulation image by processing an image reflecting a type, a terrain condition, and the like of a road.

19 Claims, 4 Drawing Sheets

SIMULATION IMAGE GENERATION METHOD AND SYSTEM FOR ADB EVALUATION OF TEST VEHICLE

CROSS-REFERENCE TO RELATED APPLICATIONS

This application claims priority under 35 U.S.C. § 119 to Korean Patent Application No. 10-2022-0105438, filed on Aug. 23, 2022, in the Korean Intellectual Property Office, the disclosure of which is incorporated herein by reference in its entirety.

TECHNICAL FIELD

The following disclosure relates to a simulation image generation method and system for adaptive driving beam (ADB) evaluation of a test vehicle, and more particularly, to a simulation image generation method and system capable of evaluating an ADB system mounted on a test vehicle corresponding to various regions to be evaluated by generating a simulation image including the other vehicle or a preceding vehicle reflecting terrain information of an actual road even without measurement information of the actual road.

BACKGROUND

In general, a lamp device, such as a headlamp as a headlight, a tail lamp, a fog lamp, and a direction indicator lamp, is installed in a vehicle. Among these lamps, the headlight is a main light device of a vehicle, and is a device which is installed on both left and right sides of a front of the vehicle to illuminate a front during night driving so that a driver may safely drive the vehicle.

With the development of technology, the headlight has been developed from a method of illuminating light by manually controlling the amount (intensity) of light to a method of adaptively controlling light according to a road and a surrounding environment (objects around a road such as street lamps, signs, etc.).

In Korea, traffic accidents occur most often in spring to autumn, but in winter, since the days are getting shorter, it is difficult to secure a field of vision of a driver and a pedestrian and the possibility of traffic accidents increases due to unfavorable driving conditions such as snowy and icy roads, and the fatality rate is high compared to the number of accidents. In particular, during late-night hours in winter, since the field of vision is narrowed, even if accidents occur, the accidents are difficult to see and the discovery of the accidents is often delayed, so it is very important to secure safety. Therefore, an adaptive headlight control method that may help safe driving during night driving becomes more important.

First, a high beam assist (HBA) system is a device that automatically turns off and turns on a high beam according to the surrounding conditions. In detail, the HBA system is a system of recognizing lights from neighboring vehicles (opposite vehicles or preceding vehicles) and automatically turning off a high beam when driving with the high beam on, and turning on the high beam again when the lights from the neighboring vehicles are no longer recognized.

The next developed technology is an adaptive driving beam (ADB) system, which is an intelligent system that does not simply turn a high beam off and on, but blocks only light in a direction illuminating neighboring vehicles while maintaining the high beam. Specifically, the ADB system is a system that preemptively darkens beam patterns output to positions of neighboring vehicles when the neighboring vehicles appear in a high beam state, and then turns on the beam patterns again when the neighboring vehicles disappear.

Accordingly, the ADB system is a system for automatically adjusting high beams to minimize glare for drivers of neighboring vehicles while maintaining brightness of a road surface ahead by providing the drivers with bright light from the high beams on dark roads.

Conventionally, for the evaluation of the ADB system, a simulation image including the other vehicle or a preceding vehicle is generated using image data captured while driving on an actual road, and a glare index by the ADB driving is quantitatively evaluated by verifying a masking area on the other vehicle or the preceding vehicle according to the ADB driving of the test vehicle.

However, in this case, when developing overseas specifications, the simulation image for screen evaluation may be generated only when road driving image data needs to be secured through a local business trip, so there is a problem in that time and money are excessively consumed.

In addition, the evaluation technology of the conventional ADB system quantitatively evaluates the glare index caused by the ADB driving while simply expressing the driving situation as "preceding vehicle appearance/preceding vehicle disappearance or the other vehicle appearance/the other vehicle disappearance." However, in the actual road driving, it is impossible to express the driving situation only with the conditions of "preceding vehicle appearance/preceding vehicle disappearance or the other vehicle appearance/the other vehicle disappearance."

For example, a separation distance of neighboring vehicles and the test vehicle by time is changed depending on a relative speed (relative vehicle speed) according to a driving speed of the preceding vehicle and a driving speed of the test vehicle or a relative speed according to a driving speed of the other vehicle and the driving speed of the test vehicle, and thus, the brightness and size of the lamp are changed.

In addition, when a road has a curvature or does not have a constant height depending on a road terrain, the lamp position is changed depending on the separation distance between the neighboring vehicles and the test vehicle.

In other words, it is necessary to generate a simulation image by reflecting (i.e., considering) the change in the relative vehicle speed that occurs during the actual road driving, the change in left/right movement of the lamp according to an angular speed that occurs when driving on a curved road, and the change in up/down movement of the lamp due to the change in height according to a terrain. However, the conventional evaluation technology of the ADB system does not reflect the conditions occurring in such an actual driving situation.

In this regard, Korean Patent Laid-Open Publication No. 10-2012-0034455 ("Adaptive Headlamp System Evaluation Apparatus and Method for the Same") discloses a technology capable of testing a state of an adaptive headlamp system in an actual vehicle state.

SUMMARY

An embodiment of the present invention is directed to providing a simulation image generation method and system for ADB evaluation of a test vehicle capable of generating a simulation image of a desired region by using a variety of collectible terrain-related information without actual road measurement information, and evaluating the ADB system mounted on the test vehicle using the generated simulation image.

Another embodiment of the present invention is directed to providing a simulation image generation technology capable of relatively accurately implementing a lamp position corresponding to the other vehicle (opposite vehicle or preceding vehicle) not only by reflecting (i.e., considering) a separation distance considering a relative speed (vehicle speed) between a test vehicle and the other vehicle, but also by reflecting a separation distance considering the relative speed between the test vehicle and the other vehicle based on special terrain conditions (curvature, height, etc.) of a road in order to generate the simulation image.

In one general aspect, a simulation image generation method for adaptive driving beam (ADB) evaluation of a test vehicle in which each step is performed by an arithmetic processing means may include: a map input step (S100) of receiving map information of a predetermined region from an outside; an information calculation step (S200) of calculating simulation object information of a neighboring vehicle based on driving information of the test vehicle, driving information of neighboring vehicles positioned around the test vehicle, and the map information;

and an image generation step (S300) of generating a simulation image by reflecting the simulation object information of the neighboring vehicle in the map information.

In addition, it is preferable that the predetermined region includes a region where the ADB evaluation of the test vehicle is to be performed.

The information calculation step (S200) may include: an evaluation setting step (S210) of setting the driving information of the test vehicle including at least one of vehicle model information, positional information, and speed information of the test vehicle; a peripheral setting step (S220) of setting the driving information of the neighboring vehicle including at least one of presence or absence, vehicle model information, and information on the number of neighboring vehicles, and positional information, speed information, and direction information of each neighboring vehicle; and an object calculation step (S230) of calculating simulation object information corresponding to the neighboring vehicle based on the test vehicle in a driving environment according to the map information.

The vehicle model information of the test vehicle may be selected or set in advance by an external input in consideration of the driving environment according to the map information, and the positional information and speed information of the test vehicle may be set in advance by the external input or are randomly set or randomly set within a preset range in consideration of the driving environment according to the map information.

In the peripheral setting step (S220), the driving information of the neighboring vehicle may be set in advance by an external input, or randomly set or randomly set within a preset range in consideration of the driving environment according to the map information.

In addition, in the peripheral setting step (S220), it is preferable to set the information on the number of neighboring vehicles to a predetermined value or greater for a habitual congestion section input from the outside in consideration of the driving environment according to the map information.

The object calculation step (S230) may include: a first calculation step (S231) of calculating a separation distance between the test vehicle and the neighboring vehicle in the driving environment according to the map information in consideration of the driving information of the test vehicle by the evaluation setting step (S210) and the driving information of the neighboring vehicle by the peripheral setting step (S220), and calculating the simulation object information including brightness information and size information of a lamp corresponding to the neighboring vehicle according to the separation distance calculated based on the test vehicle.

The object calculation step (S230) may further include a second calculation step (S232) of using the map information to analyze curvature-related information according to a road type and calculating the simulation object information including positional information of the lamp corresponding to the neighboring vehicle based on the test vehicle in consideration of the analyzed curvature-related information in the driving environment according to the map information.

The object calculation step (S230) may further include a second calculation step (S233) of using the map information to analyze terrain height-related information according to the road type and calculate the simulation object information including positional information of the lamp corresponding to the neighboring vehicle based on the test vehicle in consideration of the analyzed terrain height-related information in the driving environment according to the map information.

In the image generation step (S300), the simulation image in which the brightness information and size information corresponding to the positional information of the lamp corresponding to the neighboring vehicle are reflected based on the test vehicle may be generated in the driving environment according to the map information.

In another general aspect, a simulation image generation system for adaptive driving beam (ADB) evaluation of a test vehicle may include: a map input unit configured to receive map information of a predetermined region; a vehicle setting unit configured to set driving information of the test vehicle to be applied to the ADB evaluation and driving information of neighboring vehicles positioned around the test vehicle; a simulation calculation unit configured to calculate simulation object information of the neighboring vehicle based on the driving information of the test vehicle, the driving information of the neighboring vehicle, and map information; and an image generation unit configured to generate a simulation image by reflecting the simulation object information in the map information.

The map input unit may receive the predetermined region including a region, in which the ADB evaluation of the test vehicle is to be performed, from the outside and receive the corresponding predetermined region from a pre-associated map providing service server.

The vehicle setting unit may include: an evaluation setting unit configured to set the driving information of the test vehicle including at least one of vehicle model information, positional information, and speed information of the test vehicle; and a peripheral setting unit configured to set the driving information of the neighboring vehicle including at least one of presence or absence, vehicle model information, information on the number of neighboring vehicles, and positional information, speed information, and direction information of each neighboring vehicle.

The evaluation setting unit may select or set the vehicle model information of the test vehicle by an external input in consideration of the driving environment according to the map information, and may set the positional information and speed information of the test vehicle in advance by an external input or set the positional information and speed information of the test vehicle randomly or randomly within a preset range in consideration of the driving environment according to the map information.

The peripheral setting unit may set the positional information and speed information of the test vehicle in advance by an external input, or set the driving information of the neighboring vehicle randomly or randomly within a preset range in consideration of the driving environment according to the map information.

The peripheral setting unit may set the information on the number of neighboring vehicles to a predetermined value or greater for a habitual congestion section input from the outside in consideration of the driving environment according to the map information.

The simulation calculation unit may calculate the simulation object information corresponding to the neighboring vehicle set by the peripheral setting unit based on the test vehicle set by the evaluation setting unit in the driving environment according to the map information.

The simulation calculation unit may include a first calculation unit that calculates, by using the map information, a separation distance between the test vehicle set by the evaluation setting unit and the neighboring vehicle set by the peripheral setting unit in the driving environment according to the map information, and calculates the simulation object information including brightness information and size information of a lamp corresponding to the neighboring vehicle according to the separation distance calculated based on the test vehicle.

The simulation calculation unit may further include a second calculation unit that calculates, by analyzing curvature-related information according to a road type using the map information, the simulation object information including positional information of the lamp corresponding to the neighboring vehicle set by the peripheral setting unit based on the test vehicle set by the evaluation setting unit in consideration of the analyzed curvature-related information in the driving environment according to the map information.

The simulation calculation unit may further include a third calculation unit that calculates, by analyzing terrain height-related information according to the road type using the map information, the simulation object information including the positional information of the lamp corresponding to the neighboring vehicle set by the peripheral setting unit based on the test vehicle set by the evaluation setting unit in consideration of the analyzed terrain height-related information in the driving environment according to the map information.

The image generation unit may generate, by using the map information, the simulation image in which the brightness information and size information corresponding to the positional information of the lamp corresponding to the neighboring vehicle set by the peripheral setting unit based on the test vehicle set by the evaluation setting unit in the driving environment according to the map information are reflected.

In still another general aspect, an adaptive driving beam (ADB) evaluation system of a test vehicle may include: a condition input configured to receive preset simulation condition information for the ADB evaluation of the test vehicle; an evaluation image generation unit configured to set driving information of the test vehicle by using the received simulation condition information, set driving information of a neighboring vehicle corresponding to the other vehicle or a preceding vehicle based on the test vehicle, and generate a simulation image including simulation object information corresponding to the neighboring vehicle set based on the set test vehicle based on map information of a region where the previously input ADB evaluation is to be performed, and an evaluation performance unit configured to perform the ADB evaluation of the test vehicle by using the simulation image to perform an actual vehicle reproduction mode in which positional information, brightness information, and size information of a lamp corresponding to the neighboring vehicle are reflected by a driving environment according to the map information.

In addition, the evaluation image generator may use the map information to calculate a separation distance between the set test vehicle and the set neighboring vehicle in the driving environment according to the map information, and calculate the simulation object information including the brightness information and size information of the lamp corresponding to the neighboring vehicle according to the separation distance calculated based on the test vehicle.

In addition, the evaluation image generation unit may use the map information to analyze curvature-related information according to a road type and calculate the simulation object information including the positional information of the lamp corresponding to the neighboring vehicle based on the test vehicle in consideration of the analyzed curvature-related information in the driving environment according to the map information.

In addition, the evaluation image generation unit may use the map information to analyze terrain height-related information according to the road type and calculate the simulation object information including the positional information of the lamp corresponding to the neighboring vehicle based on the test vehicle in consideration of the analyzed terrain height-related information in the driving environment according to the map information.

In addition, the evaluation image generation unit may use the map information to generate the simulation image in which the brightness information and size information corresponding to the positional information of the lamps corresponding to the set neighboring vehicle based on the set test vehicle are reflected in the driving environment according to the map information.

DETAILED DESCRIPTION

Figure 1:
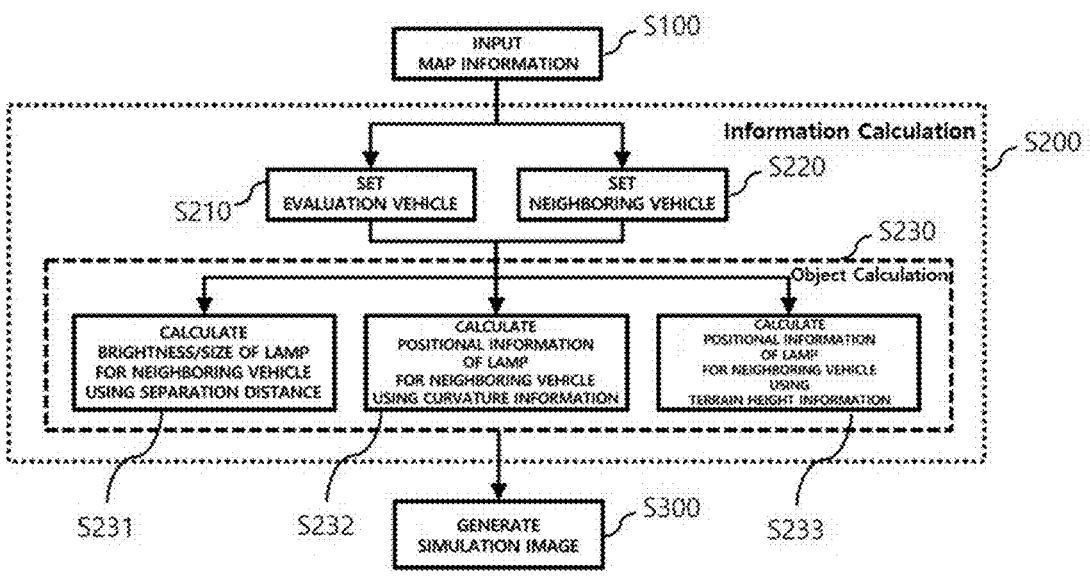
FIG. 1 is an exemplary flowchart illustrating a simulation image generation method for ADB evaluation of a test vehicle according to an embodiment of the present invention.

Hereinafter, a simulation image generation method and system for ADB evaluation of a test vehicle according to the present invention, and a preferred embodiment of an ADB evaluation system using the same will be described in detail with reference to the accompanying drawings.

A system means a set of components including devices, mechanisms, means, and the like, systematized in order to perform required functions and regularly interact with one another.

The above-described objects, features, and advantages of the present disclosure will become more obvious from the following detailed description provided in relation to the accompanying drawings. The following specific structural or functional descriptions are only exemplified for the purpose of explaining the embodiments according to the concept of the present invention, and the embodiments according to the concept of the present invention may be implemented in various forms and should not be construed as limited to the embodiments described herein or in the application. Since embodiments according to the concept of the present disclosure may be variously modified and may have several forms, specific embodiments will be illustrated in the accompanying drawings and will be described in detail in the present specification or application. However, it is to be understood that the present disclosure is not limited to specific embodiments, but includes all modifications, equivalents, and substitutions falling in the spirit and the scope of the present disclosure. Terms such as 'first', 'second', or the like, may be used to describe various components, but these components are not to be construed as being limited to these terms. The terms are used only to distinguish one component from another component. For example, a 'first' component may be named a 'second' component and the 'second' component may also be named the 'first' component, without departing from the scope of the present invention. It is to be understood that when one component is referred to as being "connected to" or "coupled to" another component, it may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween. Other expressions for describing the relationship between components, such as between and immediately between or adjacent to and directly adjacent to, etc., should be interpreted similarly. Terms used in the present specification are used only in order to describe specific embodiments rather than limiting the present disclosure. Singular forms are intended to include plural forms unless the context clearly indicates otherwise. It is to be understood that terms "include", "have", or the like, used in the present specification specify the presence of features, numerals, steps, operations, components, parts, or a combination thereof described in the present specification, but do not preclude the presence or addition of one or more other features, numerals, steps, operations, components, parts, or a combination thereof. Unless indicated otherwise, it is to be understood that all the terms used in the specification including technical and scientific terms have the same meaning as those that are generally understood by those who are skilled in the art. Terms generally used and defined in a dictionary are to be interpreted as the same meanings with meanings within the context of the related art, and are not to be interpreted as ideal or excessively formal meanings unless clearly indicated in the present specification. Hereinafter, exemplary embodiments of the present invention will be described in detail with reference to the accompanying drawings. Like reference numerals proposed in each drawing denote like components.

As described above, according to a simulation image generation method and system for adaptive driving beam (ADB) evaluation of a test vehicle according to the present invention, it is possible to generate the simulation image that can relatively accurately implement a lamp position corresponding to the other vehicle by analyzing special terrain conditions (curvature, height, etc.) of a road appearing in a road driving environment and reflecting a separation distance considering a relative speed between the test vehicle and the other vehicle (opposite vehicle or preceding vehicle) based on the analysis.

In particular, it is possible to generate the simulation image by collecting map information including terrain information through collectible open map services (Google Map, Naver Map, Kakao Map, etc.) even without actual road measurement information (road driving capturing data) and processing an image reflecting a type, a terrain condition, and the like of a road.

In an ADB evaluation system to which a simulation image generated based on these technical features is applied, when a desired predetermined region is selected, by receiving a simulation image including lamp information corresponding to the other vehicle in consideration of a driving environment according to map information even without actual road measurement information in the corresponding region and measuring a degree of brightness by a headlamp of a test vehicle in the other vehicle, more precisely, at a position of the other vehicle in an operating state of the ADB system of the test vehicle, it is possible to quantitatively measure a degree of glare by the test vehicle.

Prior to describing the technology of the present invention in detail, the ADB system of the vehicle will be described. When the other vehicle is recognized, the ADB system is a system that turns off some (area corresponding to the opposite vehicle) of a high beam emission area of the test vehicle (vehicle in which the ADB system is driving) to block glare of a driver of the other vehicle and improves an operation rate of the high beam corresponding to a driver's front field of vision of the test vehicle to secure the driver's visibility.

The conventional ADB evaluation system performs the evaluation while controlling the high beam emission area illuminating a preceding vehicle area based on preceding vehicle appearance/disappearance based on a driving lane or controlling the high beam emission area illuminating the other vehicle area based on the other vehicle appearance/disappearance based on a side lane (opposite lane). However, in the actual driving environment, due to the relative speed (relative vehicle speed) according to the respective speeds of the test vehicle (driving vehicle, reference vehicle, etc.) and the other vehicle (preceding vehicle or opposite vehicle), since the separation distance changed by time is different, the position of the other vehicle does not appear or disappear in the same pattern.

In addition, in the actual driving environment, due to terrain conditions (curvature, height, etc.) of a road, even if a number of preceding vehicles are driving ahead of the test vehicle at the same speed, the positions of the preceding vehicles at the same interval based on the test vehicle are not understood.

Accordingly, according to the simulation image generation method and system for ADB evaluation of a test vehicle according to the embodiment of the present invention, by generating a simulation image in consideration of a change in position/brightness of the other vehicle considering a relative speed between the test vehicle and the other vehicle and a change in position of the other vehicle considering a terrain condition of a road, it is possible to perform ADB evaluation simulation in a situation closest to an actual road in an ADB evaluation system to which the simulation image is applied.

FIG. 1 is an exemplary flowchart illustrating a simulation image generation method for ADB evaluation of a test vehicle according to an embodiment of the present invention.

A simulation image generation method for ADB evaluation of a test vehicle according to the embodiment of the present invention includes a map input step (S100), an information calculation step (S200), and an image generation step (S300) as illustrated in FIG. 1. Each step is included in at least one arithmetic processing means including an ECU or the like to perform an operation.

The respective steps will be described in detail.

In the map input step (S100), the map input unit 100 receives map information of a predetermined region from the outside.

Here, the predetermined region includes a region where the ADB evaluation of the test vehicle received from an ADB evaluation controller (administrator, etc.) is to be performed.

In the map input step (S100), map information on a predetermined region is received through a linked open map service (Google Map, Naver Map, Kakao Map, etc.). In this case, the map information does not simply include road type information, but preferably includes road terrain information (altitude information).

In this case, in the map input step (S100), as much as the region where the ADB evaluation of the test vehicle is to be performed is used by the ADB evaluation controller, it is determined whether there is road capturing data by actual road measurement for a predetermined region.

Accordingly, when there is road driving capturing data obtained by performing actual road measurement in the past, the map input step (S100) utilizes the corresponding road driving capturing data together with the map information, and thus, road information (type information, terrain information, etc.) is used later in more detail.

In the information calculation step (S200), the simulation object information of the neighboring vehicle is calculated based on the driving information of the neighboring vehicle including the preceding vehicle and the other vehicle positioned around the test vehicle and the map information by the map input step (S100).

Simply describing, in the information calculation step (S200), the object information of the virtual preceding vehicle/virtual object information of the other vehicle that may appear by the driving environment is calculated based on the map information, and calculated by setting conditions based on the test vehicle.

The information calculation step (S200) includes an evaluation setting step (S210), a peripheral setting step (S220), and an object calculation step (S230), as illustrated in FIG. 1.

In the evaluation setting step (S210), the vehicle setting unit 200 sets the driving information of the test vehicle including at least one of vehicle model information, positional information, and speed information of the test vehicle.

In detail, the vehicle model information of the test vehicle is selected or set by input from an external ADB evaluation controller (administrator, etc.) in advance in consideration of the driving environment according to the map information of the region where the ADB evaluation is to be performed.

That is, the test vehicle to be subjected to the ADB evaluation is received in advance, and thus, vehicle-specific headlamp positional information is acquired.

In addition, the positional information and speed information of the test vehicle are set by the input from the external ADB evaluation controller in advance, or randomly set or randomly set within preset range in consideration of the driving environment according to the map information of the region where the ADB evaluation is to be performed. That is, the positional information of the test vehicle means the positional information of the test vehicle that intends to start the ADB evaluation in the region where the ADB evaluation is to be performed, and is received from the outside, randomly set on a road, or randomly set within a preset range (for example, a street where a traffic light is positioned, a highway, etc.) as long as it does not deviate from the corresponding range.

In addition, the speed information of the test vehicle means the driving speed information of the test vehicle to be subjected to ADB evaluation, and is received from the outside, or a random speed is randomly set or randomly set as long as it does not deviate from the corresponding range within the preset range (speed limit of the region where the ADB evaluation is to be performed, drivable speed of the test vehicle, etc.).

In the peripheral setting step (S220), the vehicle setting unit 200 sets the driving information of the neighboring vehicle including at least one of presence or absence, vehicle model information, information on the number of neighboring vehicles, and positional information, speed information, and direction information of each neighboring vehicle. In this case, the neighboring vehicle is a virtual vehicle, which means a virtual vehicle to be simulated in the simulation image.

In detail, in the peripheral setting step (S220), the driving information is selected or set by input of an external ADB evaluation controller (administrator, etc.) in advance, in consideration of the driving environment according to the map information of the region where the ADB evaluation is to be performed, or randomly set or randomly set within the set or preset range.

The presence or absence of the neighboring vehicle means the presence of the other vehicle or the preceding vehicle positioned around the test vehicle, and the presence or absence of the other vehicle or the preceding vehicle is set at any position in consideration of the driving environment according to the map information.

When the other vehicle or the preceding vehicle exists in any position, the vehicle model information of the neighboring vehicle is set because it is necessary to know the vehicle model information of the corresponding neighboring vehicle in order to know the exact area information of the corresponding neighboring vehicle.

The information on the number of neighboring vehicles is to set how many neighboring vehicles to be positioned around the test vehicle, and preferably selected or set by an external input, or randomly set or randomly set within a preset range. In some cases, by receiving information on habitual congestion sections (intersections, speed limit zones, rush hours, etc.) from the external ADB evaluation controller in advance in consideration of the driving environment according to the map information of the region where the ADB evaluation is to be performed, the information on the number of neighboring vehicles is set to a preset value or greater for the corresponding conditions.

That is, even if the random setting is made, it is set to a predetermined value or greater.

Here, the preset value is preferably set in consideration of the number of neighboring vehicles that the test vehicle may meet during actual driving in consideration of the driving environment according to the map information of the region where the ADB evaluation is to be performed, and the number of neighboring vehicles itself is not limited.

The positional information of the neighboring vehicle is similar to the presence or absence of the neighboring vehicle, and any position where the other vehicle or the preceding vehicle will appear is set in consideration of the driving environment according to the map information. For example, it is received from the outside, or a random position on a road is randomly set or is randomly set as long as it does not deviate from the corresponding range within a preset range (for example, a street where a traffic light is positioned, a highway, etc.).

The speed information of the neighboring vehicle means the driving speed information of the neighboring vehicle, and is received from the outside, or a random speed is randomly set or randomly set as long as it does not deviate from the corresponding range within the preset range (speed limit of the region where the ADB evaluation is to be performed, drivable speed of the neighboring vehicle, etc.).

The direction information of the neighboring vehicle means the direction in which the neighboring vehicle is driving, and thus, the ADB driving is controlled by determining whether the vehicle is the other vehicle or the preceding vehicle based on the test vehicle.

In the object calculation step (S230), the simulation calculation unit 300 calculates the simulation object information corresponding to the neighboring vehicle based on the test vehicle in the driving environment according to the map information in consideration of the driving information of the test vehicle set by the evaluation setting step (S210) and the driving information of the neighboring vehicle set by the peripheral setting step (S220).

The object calculation step S230 includes a first calculation step (S231), a second calculation step (S232), and a third calculation step (S233) as illustrated in FIG. 1.

In the first calculation step (S231), the separation distance between the test vehicle and the neighboring vehicle is calculated in the driving environment according to the map information in consideration of the driving information of the test vehicle set by the evaluation setting step (S210) and the driving information of the neighboring vehicle set by the peripheral setting step (S220).

In this case, the separation distance between the test vehicle and the neighboring vehicle is calculated using the relative vehicle speed, which is the difference in driving speed between the test vehicle and the neighboring vehicle.

In the first calculation step (S231), the separation distance between the test vehicle and the neighboring vehicle is calculated according to a time series order, and naturally, the separation distance between the test vehicle and the neighboring vehicle changes over time due to the speed difference between the test vehicle and the neighboring vehicle. In addition, as much as the separation distance is calculated using the relative vehicle speed, the recognition level of the neighboring vehicle based on the test vehicle will be different according to the driving information of the test vehicle and the neighboring vehicle.

In the first calculation step (S231), simulation object information including brightness information and size information of a lamp corresponding to a neighboring vehicle is calculated according to the calculated separation distance.

In the second calculation step (S232), curvature-related information according to a road type is analyzed using the map information received by the map input step (S100).

Thereafter, in the driving environment according to the map information, the simulation object information including the positional information of the lamp corresponding to the neighboring vehicle is calculated based on the test vehicle in consideration of the analyzed curvature-related information.

Figure 2:
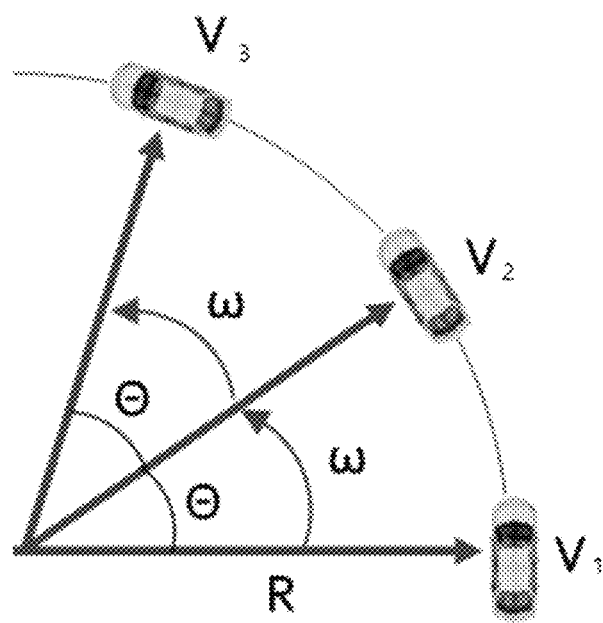
FIG. 2 is an exemplary diagram of analysis of curvature-related information utilized in a simulation image generation method and system for ADB evaluation of a test vehicle according to an embodiment of the present invention.

In other words, when a plurality of preceding vehicles (or the other vehicle) drive on a curved road based on the test vehicle, as illustrated in FIG. 2, even if all preceding vehicles drive at the same speed (angular velocity), in the test vehicle positioned at the rear of the preceding vehicle, all preceding vehicles are not seen at regular intervals, and the intervals of the preceding vehicle are seen differently depending on a degree of curvature of a road.

In consideration of this point, in the second calculation step (S232), the position change (left/right change) of the neighboring vehicle is calculated based on the test vehicle as the curvature-related information through Equation 1 below.

$$\Gamma = R\frac{\cos d\Theta}{dt} \qquad \text{[Equation 1]}$$

(Where $\Gamma$ denotes the change value in the position of the neighboring vehicle based on the test vehicle, R denotes the curvature value of the road (the rotation radius of the neighboring vehicle), $\Theta$ denotes the movement angle of the neighboring vehicles in time series order.)

In addition, in FIG. 2, $\omega$ denotes the moving angular velocity of the neighboring vehicle in the time series order, and V denotes the speed value of the neighboring vehicle at the moving position in the time series order.

In the third calculation step (S233), the terrain height-related information according to the road type is analyzed using the map information received by the map input step (S100).

Thereafter, in the driving environment according to the map information, the simulation object information including the positional information of the lamp corresponding to the neighboring vehicle is calculated based on the test vehicle in consideration of the analyzed terrain height-related information.

In other words, when a number of preceding vehicles or the other vehicles are driving on a road with uneven terrain based on the test vehicle, even if all preceding vehicles or the other vehicles drive at the same speed and maintain a certain distance, in the test vehicle (or a test vehicle positioned in front of the other vehicle) positioned behind the preceding vehicle, the preceding vehicle or the other vehicle is not seen at regular intervals on the same line, and the height of the vehicle up and down is seen differently depending on the height of the road.

In consideration of this point, in the third calculation step (S233), the position change (height change) of the neighboring vehicle is calculated based on the terrain height-related information on the test vehicle.

In this case, the terrain height-related information is analyzed by the difference value of the altitude information of the road on which the preceding vehicle or the other vehicle is positioned based on the altitude information of the road corresponding to the positional information of the test vehicle in the driving environment according to the map information.

In the image generation step (S300), the image generation unit 400 generates the simulation image by reflecting the simulation object information of the neighboring vehicle in the map information.

In detail, in the image generation step (S300), in the driving environment according to the map information, the simulation image is generated by reflecting the simulation object information corresponding to the neighboring vehicle (preceding vehicle or the other vehicle) set by the peripheral setting step (S210) based on the test vehicle set by the evaluation setting step (S220) in the map information.

That is, by considering the brightness information and size information of the lamp corresponding to the neighboring vehicle according to the first calculation step (S231) or the positional information of the lamp corresponding to the neighboring vehicle according to the second calculation step (S232) or the third calculation step (S233), in the driving environment according to the map information, based on the test vehicle, the positional information of the lamp by the virtual preceding vehicle or the other vehicle that may be met matches the brightness information and size information to generate the simulation image.

Of course, the simulation image is seen as image data through a separate output means.

Later, in the ADB evaluation system of the test vehicle, through the simulation image generated by the above process, according to the ADB driving in the actual vehicle arranged to match the test vehicle (taking into account the vehicle model set in the test vehicle), by analyzing the degree of glare (brightness information) at the position of the lamp of the preceding vehicle or the other vehicle and analyzing the brightness information for the remaining area except for the area where the lamp of the preceding vehicle or the other vehicle is positioned, when the ADB is driven, visibility information of a driver of an own vehicle and glare information of the other driver are quantitatively measured. This will be described later in detail.

Figure 3:
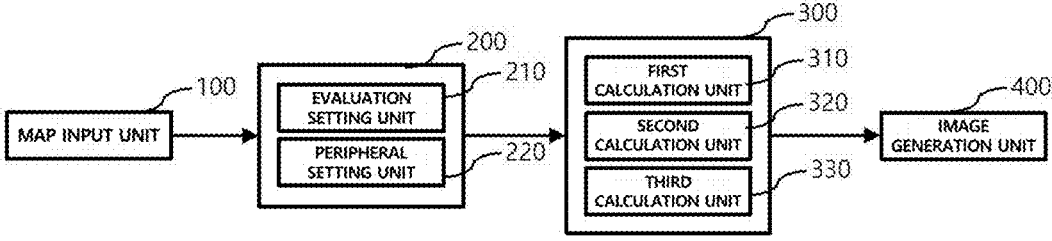
FIG. 3 is an exemplary configuration diagram illustrating a simulation image generation system for ADB evaluation of a test vehicle according to an embodiment of the present invention.

FIG. 3 is an exemplary configuration diagram illustrating a simulation image generation system for ADB evaluation of a test vehicle according to an embodiment of the present invention.

As illustrated in FIG. 3, the simulation image generation system for ADB evaluation of a test vehicle according to the embodiment of the present invention includes the map input unit 100, the vehicle setting unit 200, the simulation calculation unit 300, and the image generation system unit 400.

The respective components will be described in detail.

The map input unit 100 receives map information of a predetermined region from the outside.

Here, the predetermined region includes a region where the ADB evaluation of the test vehicle received from an ADB evaluation controller (administrator, etc.) is to be performed.

The map input unit 100 receives map information on a predetermined region through a linked open map service (Google Map, Naver Map, Kakao Map, etc.). In this case, the map information does not simply include road type information, but preferably includes road terrain information (altitude information).

In this case, the map input unit 100 determines whether there is road capturing data by actual road measurement for a predetermined region as much as the region where the ADB evaluation of the test vehicle is to be performed is used by the ADB evaluation controller.

Accordingly, when there is road driving capturing data obtained by performing actual road measurement in the past, the corresponding road driving capturing data is utilized together with the map information, and thus, road information (type information, terrain information, etc.) is used later in more detail.

The vehicle setting unit 200 sets the driving information of the test vehicle to be applied to the ADB evaluation and the driving information of the neighboring vehicle including the preceding vehicle and the other vehicle positioned around the test vehicle.

As illustrated in FIG. 3, the vehicle setting unit 200 includes an evaluation setting unit 210 and a peripheral setting unit 220.

The evaluation setting unit 210 sets the driving information of the test vehicle including at least one of vehicle model information, positional information, and speed information of the test vehicle.

In detail, the vehicle model information of the test vehicle is selected or set by input from an external ADB evaluation controller (administrator, etc.) in advance in consideration of the driving environment according to the map information of the region where the ADB evaluation is to be performed. That is, the test vehicle to be subjected to the ADB evaluation is received in advance, and thus, vehicle-specific headlamp positional information is acquired.

In addition, the positional information and speed information of the test vehicle are set by the input from the external ADB evaluation controller in advance, or randomly set or randomly set within preset range in consideration of the driving environment according to the map information of the region where the ADB evaluation is to be performed. That is, the positional information of the test vehicle means the positional information of the test vehicle that intends to start the ADB evaluation in the region where the ADB evaluation is to be performed, and is received from the outside, randomly set on a road, or randomly set within a preset range (for example, a street where a traffic light is located, a highway, etc.) as long as it does not deviate from the corresponding range.

In addition, the speed information of the test vehicle means the driving speed information of the test vehicle to be subjected to ADB evaluation, and is received from the outside, or a random speed is randomly set or randomly set as long as it does not deviate from the corresponding range within the preset range (speed limit of the region where the ADB evaluation is to be performed, drivable speed of the test vehicle, etc.).

The peripheral setting unit 220 sets the driving information of the neighboring vehicle including at least one of presence or absence of neighboring vehicle, vehicle model information, number information, and positional information, speed information, and direction information of each neighboring vehicle. In this case, the neighboring vehicle is a virtual vehicle, which means a virtual vehicle to be simulated in the simulation image.

In detail, the driving information is selected or set by input of an external ADB evaluation controller (administrator, etc.) in advance, in consideration of the driving environment according to the map information of the region where the ADB evaluation is to be performed, or randomly set or randomly set within the set or preset range.

The presence or absence of the neighboring vehicle means the presence of the other vehicle or the preceding vehicle positioned around the test vehicle, and the presence or absence of the other vehicle or the preceding vehicle is set at any position in consideration of the driving environment according to the map information.

When the other vehicle or the preceding vehicle exists in any position, the vehicle model information of the neighboring vehicle is set because it is necessary to know the vehicle model information of the corresponding neighboring vehicle in order to know the exact area information of the corresponding neighboring vehicle.

The information on the number of neighboring vehicles is to set how many neighboring vehicles to be positioned around the test vehicle, and preferably selected or set by an external input, or randomly set or randomly set within a preset range. In some cases, by receiving information on habitual congestion sections (intersections, speed limit zones, rush hours, etc.) from the external ADB evaluation controller in advance in consideration of the driving environment according to the map information of the region where the ADB evaluation is to be performed, the information on the number of neighboring vehicles is set to a preset value or greater for the corresponding conditions.

That is, even if the random setting is made, it is set to a predetermined value or greater.

Here, the preset value is preferably set in consideration of the number of neighboring vehicles that the test vehicle may meet during actual driving in consideration of the driving environment according to the map information of the region where the ADB evaluation is to be performed, and the number of neighboring vehicles itself is not limited.

The positional information of the neighboring vehicle is similar to the presence or absence of the neighboring vehicle, and any position where the other vehicle or the preceding vehicle will appear is set in consideration of the driving environment according to the map information. For example, the positional information is received from the outside, or a random position on a road is randomly set or is randomly set as long as it does not deviate from the corresponding range within a preset range (for example, a street where a traffic light is positioned, a highway, etc.).

The speed information of the neighboring vehicle means the driving speed information of the neighboring vehicle, and is received from the outside, or a random speed is randomly set or randomly set as long as it does not deviate from the corresponding range within the preset range (speed limit of the region where the ADB evaluation is to be performed, drivable speed of the neighboring vehicle, etc.).

The direction information of the neighboring vehicle means the direction in which the neighboring vehicle is driving, and thus, the ADB driving is controlled by determining whether the vehicle is the other vehicle or the preceding vehicle based on the test vehicle.

The simulation calculation unit 300 calculates the simulation object information of the neighboring vehicle based on the driving information of the test vehicle set by the vehicle setting unit 200, the driving information of the neighboring vehicle, and the map information by the map input unit 100.

Simply describing, the object information of the virtual preceding vehicle/virtual object information of the other vehicle that may appear by the driving environment is calculated based on the map information, and calculated by setting conditions based on the test vehicle.

As illustrated in FIG. 3, the simulation calculation unit 300 includes a first calculation unit 310, a second calculation unit 320, and a third calculation unit 330.

The first calculation unit 310 calculates the separation distance between the test vehicle and the neighboring vehicle in the driving environment according to the map information in consideration of the set driving information of the test vehicle and the set driving information of the neighboring vehicle.

In this case, the separation distance between the test vehicle and the neighboring vehicle is calculated using the relative vehicle speed, which is the difference in driving speed between the test vehicle and the neighboring vehicle.

The first calculation unit 310 calculates the separation distance between the test vehicle and the neighboring vehicle according to a time series, and naturally, the separation distance between the test vehicle and the neighboring vehicle changes over time due to the speed difference between the test vehicle and the neighboring vehicle. In addition, as much as the separation distance is calculated using the relative vehicle speed, the recognition level of the neighboring vehicle based on the test vehicle will be different according to the driving information of the test vehicle and the neighboring vehicle. The simulation object information including brightness information and size information of a lamp corresponding to a neighboring vehicle is calculated according to the calculated separation distance.

The second calculation unit 320 analyzes curvature-related information according to a road type by using the received map information.

Thereafter, in the driving environment according to the map information, the simulation object information including the positional information of the lamp corresponding to the neighboring vehicle is calculated based on the test vehicle in consideration of the analyzed curvature-related information.

In other words, when a plurality of preceding vehicles (or the other vehicle) drive on a curved road based on the test vehicle, as illustrated in FIG. 2, even if all preceding vehicles drive at the same speed (angular velocity), in the test vehicle positioned at the rear of the preceding vehicle, all preceding vehicles are not seen at regular intervals, and the intervals of the preceding vehicle are seen differently depending on a degree of curvature of a road.

In consideration of this point, the position change (left/ right change) of the neighboring vehicle is calculated based on the test vehicle as the curvature-related information through Equation 1 below.

The third calculation unit 330 analyzes terrain-related information according to a road type by using the received map information.

Thereafter, in the driving environment according to the map information, the simulation object information including the positional information of the lamp corresponding to the neighboring vehicle is calculated based on the test vehicle in consideration of the analyzed terrain height-related information.

In other words, when a number of preceding vehicles or the other vehicles are driving on a road with uneven terrain based on the test vehicle, even if all preceding vehicles or the other vehicles drive at the same speed and maintain a certain distance, in the test vehicle (or a test vehicle positioned in front of the other vehicle) positioned behind the preceding vehicle, the preceding vehicle or the other vehicle is not seen at regular intervals on the same line, and the height of the vehicle up and down is seen differently depending on the height of the road.

In consideration of this point, in the third calculation unit 330 calculates the position change (height change) of the neighboring vehicle based on the terrain height-related information on the test vehicle.

In this case, the terrain height-related information is analyzed by the difference value of the altitude information of the road on which the preceding vehicle or the other vehicle is positioned based on the altitude information of the road corresponding to the positional information of the test vehicle in the driving environment according to the map information.

The image generation unit 400 generates the simulation image by reflecting the simulation object information (brightness information, size information, and positional information of a lamp) by the first calculation unit 310 to the third calculation unit 330 in the map information.

In detail, the image generation unit 400 reflects the simulation object information corresponding to the set neighboring vehicle (preceding vehicle or the other vehicle) based on the set test vehicle in the driving environment according to the map information in the map information to generate the simulation image.

That is, by considering the brightness information and size information of the lamp corresponding to the neighboring vehicle by the first calculation unit 310 or the positional information of the lamp corresponding to the neighboring vehicle by the second calculation unit 320 and the third calculation unit 330, in the driving environment according to the map information, based on the test vehicle, the positional information of the lamp by the virtual preceding vehicle or the other vehicle that may be met matches the brightness information and size information to generate the simulation image.

Of course, the simulation image is seen as image data through a separate output means.

Figure 4:
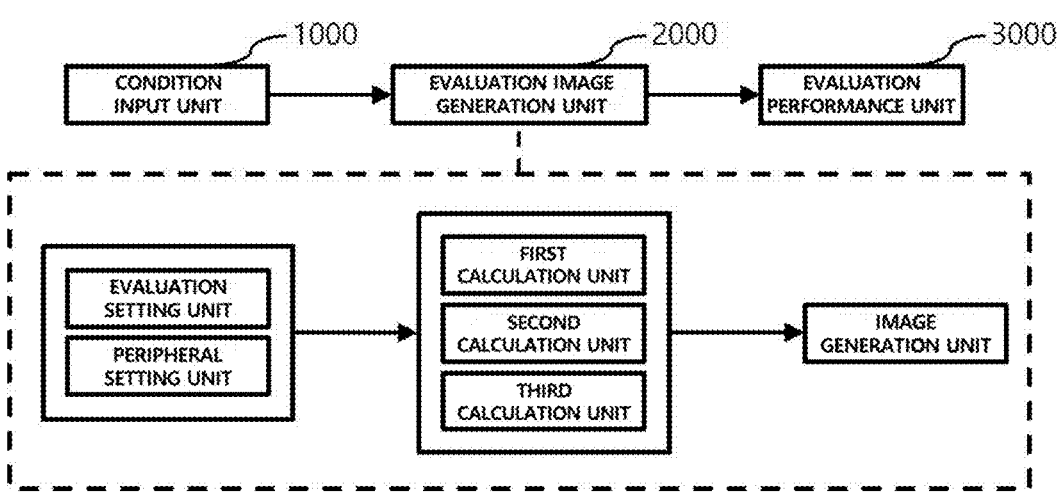
FIG. 4 is an exemplary configuration diagram illustrating an ADB evaluation system to which a simulation image generation technology for ADB evaluation of a test vehicle is applied according to an embodiment of the present invention.

FIG. 4 is an exemplary configuration diagram illustrating an ADB evaluation system using a simulation image generated by the simulation image generation method for ADB evaluation of a test vehicle according to an embodiment of the present invention.

As illustrated in FIG. 4, the ADB evaluation system according to the embodiment of the present invention includes a condition input unit 1000, an evaluation image generation unit 2000, and an evaluation performance unit 3000.

The respective components will be described in detail.

The condition input unit 1000 receives simulation condition information preset for the ADB evaluation of the test vehicle. The simulation condition information includes desired ADB evaluation region information input from an external ADB evaluation controller (administrator, etc.), information for setting driving information of a test vehicle, and information for setting driving information of a neighboring vehicle in order to generate the simulation image for the ADB evaluation of the test vehicle.

In detail, the map information of the region where ADB evaluation of the test vehicle is to be performed is received through the linked open map service (Google Map, Naver Map, Kakao Map, etc.).

In addition, the driving information of the test vehicle including at least one of vehicle model information, positional information, and speed information of the test vehicle is received, and the driving information of the neighboring vehicle including at least one of presence or absence, vehicle model information, information on the number of neighboring vehicles, and positional information, speed information, and direction information of each neighboring vehicle is received.

The evaluation image generation unit 2000 corresponds to the description by the simulation image generation method for ADB evaluation of a test vehicle according to the embodiment of the present invention described above, and uses the simulation condition information received by the condition input unit 1000 to set the driving information of the test vehicle and sets the driving information of the other vehicle or the neighboring vehicle corresponding to the preceding vehicle based on the test vehicle.

In addition, based on the received map information to be subjected to the ADB evaluation, the simulation image including the simulation object information corresponding to the set neighboring vehicle based on the set test vehicle is generated.

First, in setting the driving information of the test vehicle, the vehicle model information of the test vehicle is selected or set by input from an external ADB evaluation controller (administrator, etc.) in advance in consideration of the driving environment according to the map information of the region in which the ADB evaluation is to be performed. That is, the test vehicle to be subjected to the ADB evaluation is received in advance, and thus, vehicle-specific headlamp positional information is acquired.

In addition, the positional information and speed information of the test vehicle are set by the input from the external ADB evaluation controller in advance, or randomly set or randomly set within preset range in consideration of the driving environment according to the map information of the region in which the ADB evaluation is to be performed. That is, the positional information of the test vehicle means the positional information of the test vehicle that intends to start the ADB evaluation in the region in which the ADB evaluation is to be performed, and is received from the outside, randomly set on a road, or randomly set within a preset range (for example, a street where a traffic light is located, a highway, etc.) as long as it does not deviate from the corresponding range.

In addition, the speed information of the test vehicle means the driving speed information of the test vehicle to be subjected to ADB evaluation, and is received from the outside, or a random speed is randomly set or randomly set as long as it does not deviate from the corresponding range within the preset range (speed limit of the region in which the ADB evaluation is to be performed, drivable speed of the test vehicle, etc.).

In detail, in setting the driving information of the neighboring vehicle, the driving information is selected or set by input of an external ADB evaluation controller (administrator, etc.) in advance, in consideration of the driving environment according to the map information of the region in which the ADB evaluation is to be performed, or randomly set or randomly set within the set or preset range.

The presence or absence of the neighboring vehicle means the presence of the other vehicle or the preceding vehicle positioned around the test vehicle, and the presence or absence of the other vehicle or the preceding vehicle is set at any position in consideration of the driving environment according to the map information.

When the other vehicle or the preceding vehicle exists in any position, the vehicle model information of the neighboring vehicle is set because it is necessary to know the vehicle model information of the corresponding neighboring vehicle in order to know the exact area information of the corresponding neighboring vehicle.

The information on the number of neighboring vehicles is to set how many neighboring vehicles to be positioned around the test vehicle, and preferably selected or set by an external input, or randomly set or randomly set within a preset range. In some cases, by receiving information on habitual congestion sections (intersections, speed limit zones, rush hours, etc.) from the external ADB evaluation controller in advance in consideration of the driving environment according to the map information of the region where the ADB evaluation is to be performed, the information on the number of neighboring vehicles is set to a preset value or greater for the corresponding conditions.

That is, even if the random setting is made, it is set to a predetermined value or greater.

Here, the preset value is preferably set in consideration of the number of neighboring vehicles that the test vehicle may meet during actual driving in consideration of the driving environment according to the map information of the region where the ADB evaluation is to be performed, and the number of neighboring vehicles itself is not limited.

The positional information of the neighboring vehicle is similar to the presence or absence of the neighboring vehicle, and any position where the other vehicle or the preceding vehicle will appear is set in consideration of the driving environment according to the map information. For example, the positional information is received from the outside, or a random position on a road is randomly set or is randomly set as long as it does not deviate from the corresponding range within a preset range (for example, a street where a traffic light is positioned, a highway, etc.).

The speed information of the neighboring vehicle means the driving speed information of the neighboring vehicle, and is received from the outside, or a random speed is randomly set or randomly set as long as it does not deviate from the corresponding range within the preset range (speed limit of the region where the ADB evaluation is to be performed, drivable speed of the neighboring vehicle, etc.).

The direction information of the neighboring vehicle means the direction in which the neighboring vehicle is driving, and thus, the ADB driving is controlled by determining whether the vehicle is the other vehicle or the preceding vehicle based on the test vehicle.

Thereafter, the simulation object information of the neighboring vehicle is calculated based on the set driving information of the test vehicle, the driving information of the neighboring vehicle, and the map information.

Simply describing, the object information of the virtual preceding vehicle/virtual object information of the other vehicle that may appear by the driving environment is calculated based on the map information, and calculated by setting conditions based on the test vehicle.

Describing the process of calculating the simulation object information as an example, the first calculation unit 310 calculates the separation distance between the test vehicle and the neighboring vehicle in the driving environment according to the map information in consideration of the set driving information of the test vehicle and the set driving information of the neighboring vehicle.

In this case, the separation distance between the test vehicle and the neighboring vehicle is calculated using the relative vehicle speed, which is the difference in driving speed between the test vehicle and the neighboring vehicle.

The separation distance between the test vehicle and the neighboring vehicle is calculated according to a time series, and naturally, the separation distance between the test vehicle and the neighboring vehicle changes over time due to the speed difference between the test vehicle and the neighboring vehicle. In addition, as much as the separation distance is calculated using the relative vehicle speed, the recognition level of the neighboring vehicle based on the test vehicle will be different according to the driving information of the test vehicle and the neighboring vehicle. The simulation object information including brightness information and size information of a lamp corresponding to a neighboring vehicle is calculated according to the calculated separation distance.

Describing the process of calculating simulation object information as another example, the second calculation unit 320 analyzes the curvature-related information according to the road type by using the received map information.

Thereafter, in the driving environment according to the map information, the simulation object information including the positional information of the lamp corresponding to the neighboring vehicle is calculated based on the test vehicle in consideration of the analyzed curvature-related information.

In other words, when a plurality of preceding vehicles (or the other vehicle) drive on a curved road based on the test vehicle, as illustrated in FIG. 2, even if all preceding vehicles drive at the same speed (angular velocity), in the test vehicle positioned at the rear of the preceding vehicle, all preceding vehicles are not seen at regular intervals, and the intervals of the preceding vehicle are seen differently depending on a degree of curvature of a road.

In consideration of this point, the position change (left/right change) of the neighboring vehicle is calculated based on the test vehicle as the curvature-related information through Equation 1 below.

Describing the process of calculating simulation object information as another example, the third calculation unit 330 analyzes the terrain height-related information according to the road type by using the received map information.

Thereafter, in the driving environment according to the map information, the simulation object information including the positional information of the lamp corresponding to the neighboring vehicle is calculated based on the test vehicle in consideration of the analyzed terrain height-related information.

In other words, when a number of preceding vehicles or the other vehicles are driving on a road with uneven terrain based on the test vehicle, even if all preceding vehicles or the other vehicles drive at the same speed and maintain a certain distance, in the test vehicle (or a test vehicle positioned in front of the other vehicle) positioned behind the preceding vehicle, the preceding vehicle or the other vehicle is not seen at regular intervals on the same line, and the height of the vehicle up and down is seen differently depending on the height of the road.

In consideration of this point, in the third calculation unit 330 calculates the position change (height change) of the neighboring vehicle based on the terrain height-related information on the test vehicle.

In this case, the terrain height-related information is analyzed by the difference value of the altitude information of the road on which the preceding vehicle or the other vehicle is positioned based on the altitude information of the road corresponding to the positional information of the test vehicle in the driving environment according to the map information.

Finally, the evaluation image generation unit 2000 generates the simulation image by reflecting the simulation object information calculated in this way in the map information.

In detail, by using the simulation object information corresponding to the set neighboring vehicle (preceding vehicle or the other vehicle) based on the set test vehicle in the driving environment according to the map information, the simulation image is generated.

By matching the positional information of the lamp by the virtual preceding vehicle or the other vehicle that may be met based on the test vehicle in the driving environment according to the map information, to the brightness information and size information matching the corresponding positional information, the simulation image is generated.

The evaluation performance unit 3000 receives the simulation image by the evaluation image generation unit 2000 as a screen evaluation image, not the ADB evaluation through the actual vehicle driving, and performs the simulation evaluation.

In detail, the evaluation performance unit 3000 uses the simulation image by the evaluation image generation unit 2000 to perform the actual vehicle reproduction mode in which the positional information, brightness information, and size information of the lamp corresponding to the neighboring vehicle by the driving environment according to the map information is reflected, thereby perform the ADB evaluation of the test vehicle.

In this case, the evaluation performance unit 3000 emits light corresponding to the lamp position of the preceding vehicle or the other vehicle to the output means by which the simulation image as well as the simulation object information by the simulation image is output, thereby improving the reliability of the ADB driving of the test vehicle. Of course, the actual light corresponding to the lamp position of the test vehicle may be emitted. In this case, the positions of the lamps corresponding to the neighboring vehicle and the test vehicle are included in the simulation image and may also be extracted through the received simulation condition information.

At least one of a masking evaluation, a followability evaluation, and a glare evaluation according to the actual vehicle reproduction mode may be performed through the evaluation performance unit 3000.

For example, for the masking evaluation/glare evaluation, according to the ADB driving state of the test vehicle, by measuring a brightness level at a position corresponding to the preceding vehicle or the other vehicle, and measuring the widths for each brightness in the masking area, the simulation may be performed to evaluate the degree of glare from the neighboring vehicle according to the ADB driving of the test vehicle.

For example, for the followability evaluation, it is possible to evaluate whether the ADB driving state of the test vehicle is well following the preceding vehicle or the other vehicle through a simulation image including driving of a test vehicle on a curved road in slalom mode.

The evaluation performance unit 3000 may evaluate the control restoration performance according to the disappearance of the neighboring vehicle after the ADB driving of the test vehicle for the corresponding area controls brightness off or brightness decrease according to the appearance of the neighboring vehicle.

To this end, when a neighboring vehicle appears, the time it takes for the ADB driving state of the test vehicle to respond is measured, and the time it takes for the ADB driving state of the test vehicle to respond thereto even after the neighboring vehicle disappears is measured.

Conventionally, in the process of verifying and tuning the ADB driving performance of the test vehicle with the naked eye through road driving in the actual vehicle state, it was impossible to quantify and evaluate the problem reproduction as the masking area (dark zone) was verified in the driving state.

On the other hand, the ADB evaluation system of the test vehicle according to an embodiment of the present invention performs the simulation evaluation in the evaluation performance unit 3000 through the simulation image generated by the evaluation image generation unit 2000, so localization evaluation can be made through a simulation without actual vehicle evaluation on a road and immediate response can be made even when developing overseas vehicle models.

The present invention described above can be embodied as a computer readable code on a medium in which a program is recorded. A computer readable medium may include all kinds of recording devices in which data that may be read by a computer system are stored. An example of the computer readable medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disk, an optical data storage, and the like, and also include a medium implemented in a form of a carrier wave (for example, transmission through the Internet). In addition, the computer may include a simulation image generation system for ADB evaluation of a test vehicle or an ADB evaluation system.

As described above, according to a simulation image generation method and system for ADB evaluation of a test vehicle according to the present invention, it is possible to generate the simulation image that can relatively accurately implement a lamp position corresponding to the other vehicle by analyzing special terrain conditions (curvature, height, etc.) of a road appearing in a road driving environment and reflecting a separation distance considering a relative speed between the test vehicle and the other vehicle (opposite vehicle or preceding vehicle) based on the analysis.

In particular, it is possible to generate the simulation image by collecting map information including terrain information through collectible open map services (Google Map, Naver Map, Kakao Map, etc.) even without actual road measurement information (road driving capturing data) and processing an image reflecting a type, a terrain condition, and the like of a road.

That is, by generating a simulation image in consideration of a change in position/brightness of the other vehicle considering a relative speed between the test vehicle and the other vehicle and a change in position of the other vehicle considering a terrain condition of a road, it is possible to perform ADB evaluation simulation in a situation closest to an actual road in an ADB evaluation system to which the simulation image is applied.

In addition, according to an ADB evaluation system to which a simulation image generated by a simulation image generation method for ADB evaluation of a vehicle is applied, in the case of the ADB evaluation system to which the simulation image generated based on the above-described technical features is applied, when a desired predetermined region is selected, by receiving a simulation image including lamp information corresponding to the other vehicle in consideration of a driving environment according to map information even without actual road measurement information in the corresponding region and measuring a degree of brightness by a headlamp of a test vehicle in the other vehicle, more precisely, at a position of the other vehicle in an operating state of the ADB system of the test vehicle, it is possible to quantitatively measure a degree of glare by the test vehicle.

Although preferred embodiments of the present invention have been described above, the embodiments disclosed in the present invention are only for explaining, not limiting, the technical spirit of the present invention. Accordingly, the technical spirit of the present invention includes not only each disclosed embodiment, but also a combination of the disclosed embodiments, and further, the scope of the technical spirit of the present invention is not limited by these embodiments. In addition, many modifications and alterations of the present disclosure may be made by those skilled in the art to which the present disclosure pertains without departing from the spirit and scope of the accompanying claims. In addition, it is to be considered that all of these modifications and alterations fall within the scope of the present disclosure.

What is claimed is:

1. A simulation image generation method used in evaluating and tuning an adaptive driving beam (ADB) system of a test vehicle, the method comprising:

a map input step of receiving externally provided map information of a predetermined region, the map information providing road terrain information including road curvature and road height information along a length of road;

prior to generating a simulation image, an information calculation step, performed by an arithmetic processor, of calculating simulation object information of a neighboring vehicle based on driving information of the test vehicle, driving information of a neighboring vehicle positioned around the test vehicle, and the map information, including the road curvature and road height information along a length of the road, wherein the simulation object information includes brightness and size information of lamps of the neighboring vehicle based on a distance between the test vehicle and the neighboring vehicle, positional information of the lamps of the neighboring vehicle based on an analysis of the road curvature from the test vehicle, and positional information of lamps of the neighboring vehicle based on an analysis of the road height from the test vehicle;

an image generation step of generating the simulation image by reflecting the simulation object information of the neighboring vehicle in the map information; the simulation image for verifying and tuning performance of the ADB system based on response of the ADB system to the simulation image; and a tuning step of verifying and tuning performance of the ADB system based on response of the ABD system to the simulation image.

2. The simulation image generation method of claim 1, wherein, in the map input step, the arithmetic processor receives the externally provided predetermined region including a region in which the ADB evaluation of the test vehicle is to be performed, and receives a corresponding predetermined region from a pre-associated map-providing service server.

3. The simulation image generation method of claim 1, wherein the information calculation step includes:

an evaluation setting step of setting the driving information of the test vehicle including at least one of vehicle model information, positional information, and speed information of the test vehicle;

a peripheral setting step of setting the driving information of the neighboring vehicle including at least one of vehicle presence or absence, vehicle model information, information on neighboring vehicles, and positional information, speed information, and direction information of each neighboring vehicle; and an object calculation step of calculating simulation object information corresponding to the neighboring vehicle based on the test vehicle in a driving environment according to the map information.

4. The simulation image generation method of claim 3, wherein the vehicle model information of the test vehicle is selected, or set, in advance by an external input in consideration of a driving environment according to the map information; and the positional information and speed information of the test vehicle are preset by the external input, or are randomly set, or randomly set within a preset range, in consideration of the driving environment according to the map information.

5. The simulation image generation method of claim 3, wherein, in the peripheral setting step, the driving information of the neighboring vehicle is preset by an external input, or randomly set or randomly set within a preset range in consideration of the driving environment according to the map information.

6. The simulation image generation method of claim 5, wherein the object calculation step includes:

a first calculation step of calculating a separation distance between the test vehicle and the neighboring vehicle in the driving environment according to the map information in consideration of (1) the driving information of the test vehicle by the evaluation setting step and (2) the driving information of the neighboring vehicle by the peripheral setting step, and calculating the simulation object information including brightness information and size information of the lamps of the neighboring vehicle according to the separation distance calculated based on the test vehicle.

7. The simulation image generation method of claim 6, wherein the object calculation step further includes a second calculation step of using the map information to analyze curvature-related information according to a road type and calculating the simulation object information including positional information of the lamps of the neighboring vehicle based on the test vehicle in consideration of the analyzed curvature-related information in the driving environment according to the map information.

8. The simulation image generation method of claim 7, wherein the object calculation step further includes a third calculation step of using the map information to analyze terrain height-related information according to the road type and calculate the simulation object information including positional information of the lamps of the neighboring vehicle based on the test vehicle in consideration of the analyzed terrain height-related information in the driving environment according to the map information.

9. The simulation image generation method of claim 8, wherein, in the image generation step, the simulation image in which the brightness information and size information corresponding to the positional information of the lamps of the neighboring vehicle based on the test vehicle are reflected is generated in the driving environment according to the map information.

10. A simulation image generation system for evaluation and tuning of an adaptive driving beam (ADB) of a test vehicle, the simulation image generation system comprising:

a map input unit configured to receive map information of a predetermined region, the map information providing road terrain information including road curvature and road height information along a length of road;

a vehicle setting unit configured to set driving information of the test vehicle to be applied to the ADB evaluation and driving information of a neighboring vehicle positioned around the test vehicle;

a simulation calculation unit configured to calculate simulation object information of the neighboring vehicle prior to generation of a simulation image, the simulation object information of the neighboring vehicle based on the driving information of the test vehicle, the driving information of the neighboring vehicle, and the map information, including the road curvature and road height information along a length of the road, wherein the simulation object information includes brightness and size information of lamps of the neighboring vehicle based on a distance between the test vehicle and the neighboring vehicle, positional information of the lamps of the neighboring vehicle based on an analysis of the road curvature from the test vehicle, and positional information of lamps of the neighboring vehicle based on an analysis of the road height from the test vehicle;

an image generation unit configured to generate the simulation image by reflecting the simulation object information in the map information, the simulation image for verifying and tuning ADB performance of the test vehicle based on response of the ADB to the simulation image; and a tuning system to verify and tune performance of the ADB system based on response of the ABD system to the simulation image.

11. The simulation image generation system of claim 10, wherein the map input unit receives externally provided information of a predetermined region including a region in which the ADB evaluation of the test vehicle is to be performed, and receives a corresponding predetermined region from a pre-associated map-providing service server.

12. The simulation image generation system of claim 10, wherein the vehicle setting unit includes:

an evaluation setting unit configured to set the driving information of the test vehicle including at least one of vehicle model information, positional information, and speed information of the test vehicle; and a peripheral setting unit configured to set the driving information of the neighboring vehicle including at least one of vehicle presence or absence, vehicle model information, information on number of neighboring vehicles, and positional information, speed information, and direction information of each neighboring vehicle.

13. The simulation image generation system of claim 12, wherein the evaluation setting unit:

selects or sets the vehicle model information of the test vehicle provided externally based on a driving environment according to the map information, and presets the positional information and speed information of the test vehicle provided externally or sets the positional information and speed information of the test vehicle randomly or randomly within a preset range in consideration of the driving environment according to the map information.

14. The simulation image generation system of claim 13, wherein the peripheral setting unit externally presets the positional information and speed information of the test vehicle, or sets the driving information of the neighboring vehicle randomly, or randomly within a preset range, in consideration of the driving environment according to the map information.

15. The simulation image generation system of claim 14, wherein the simulation calculation unit calculates the simulation object information corresponding to the neighboring vehicle set by the peripheral setting unit in turn based on the test vehicle set by the evaluation setting unit in the driving environment according to the map information.

16. The simulation image generation system of claim 15, wherein the simulation calculation unit includes a first calculation unit that calculates, by using the map information, a separation distance between (1) the test vehicle set by the evaluation setting unit and (2) the neighboring vehicle set by the peripheral setting unit in the driving environment according to the map information, and calculates the simulation object information including brightness information and size information of a lamp corresponding to the neighboring vehicle according to the separation distance calculated based on the test vehicle.

17. The simulation image generation system of claim 16, wherein the simulation calculation unit further includes a second calculation unit that calculates, by analyzing curvature-related information according to a road type using the map information, the simulation object information including positional information of the lamp corresponding to the neighboring vehicle set by the peripheral setting unit in turn based on the test vehicle set by the evaluation setting unit in consideration of the analyzed curvature-related information in the driving environment according to the map information.

18. The simulation image generation system of claim 17, wherein the simulation calculation unit further includes a third calculation unit that calculates, by analyzing terrain height-related information according to the road type using the map information, the simulation object information including the positional information of the lamp corresponding to the neighboring vehicle set by the peripheral setting unit based on the test vehicle set by the evaluation setting unit in consideration of the analyzed terrain height-related information in the driving environment according to the map information.

19. The simulation image generation system of claim 18, wherein the image generation unit generates, by using the map information, the simulation image in which are reflected the brightness information and size information corresponding to the positional information of the lamp corresponding to the neighboring vehicle set by the peripheral setting unit based on the test vehicle in turn set by the evaluation setting unit in the driving environment according to the map information.

* * * * *